Sept. 2, 1952     W. F. NIEMI     2,608,788
DARTING FISH LURE OF THE SWIMMING TYPE
Filed March 6, 1950     2 SHEETS—SHEET 1
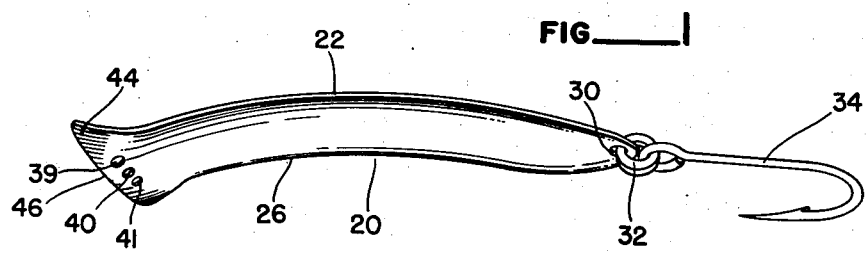
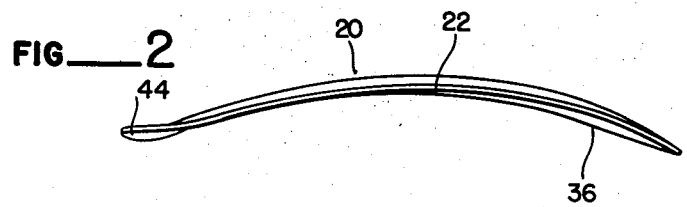
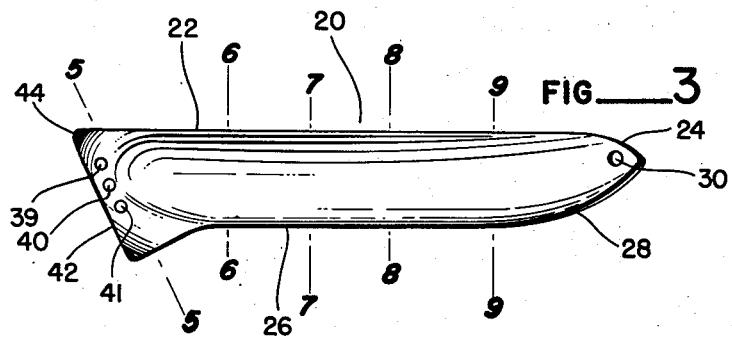
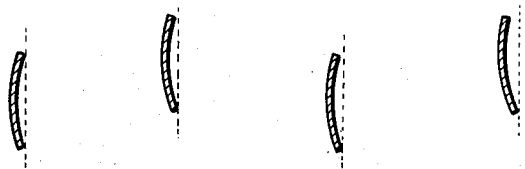
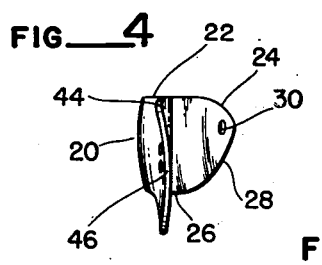
WILLIAM F. NIEMI
Inventor
By Smith & Tuck
Attorneys Sept. 2, 1952            W. F. NIEMI            2,608,788
DARTING FISH LURE OF THE SWIMMING TYPE
Filed March 6, 1950            2 SHEETS—SHEET 2
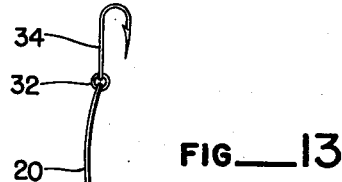
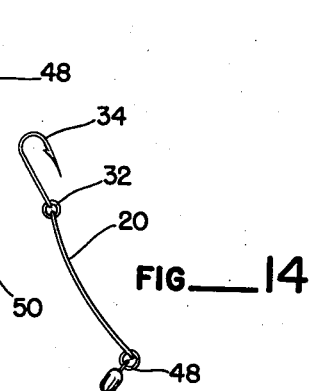
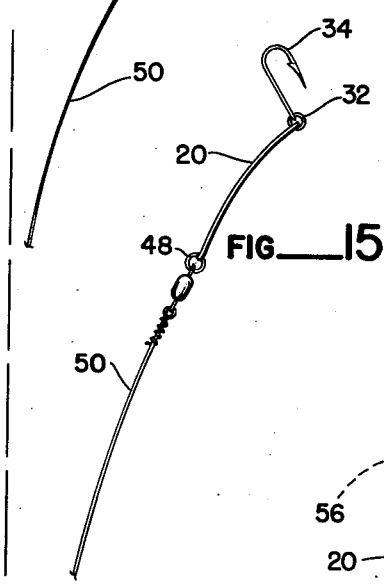
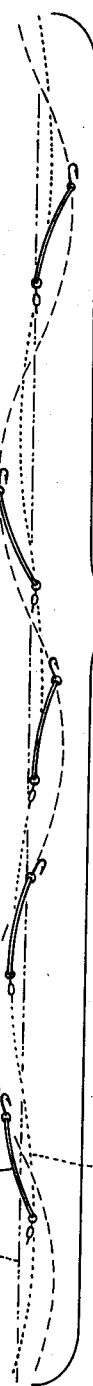
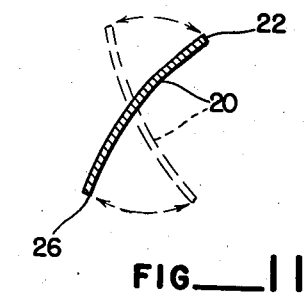
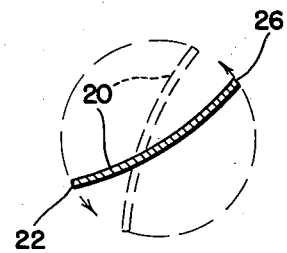
WILLIAM F. NIEMI
Inventor
By Smith & Tuck
Attorneys Patented Sept. 2, 1952

2,608,788

UNITED STATES PATENT OFFICE 2,608,788

DARTING FISH LURE OF THE SWIMMING TYPE

William F. Niemi, Seattle, Wash.

Application March 6, 1950, Serial No. 147,817

5 Claims. (Cl. 43—42.5)

This present invention relates to the general class of one-piece metal fishing lures, quite commonly known as fishing spoons. The invention is further characterized by being of that type of fishing spoons, which normally tends to ride on edge and its prime movement is a decided swimming action; then, due to the particular shape of the longitudinally dished body, the spoon tends to rock about its longitudinal axis while it is also oscillating on each side of the line of draft, pivoting on its line attachment ring. At a point where the rocking motion has become quite pronounced, and this is due to the particular shape of the spoon, the spoon will revolve and, at the completion of the revolution, dart off to one side of the line of draft.

A large number of fishing lures have been made following the principles of the swimming spoon. This family of lures came into general and widespead use with the McMahon spoon, shown in Patent No. 1,136,475, and this is probably the first spoon of the swimming type that ever attained very widespread use. This spoon has become practically the standard spoon for use of commercial salmon trollers operating in the North Pacific waters contiguous the United States and Canada. This general type of spoon gives, for the commercial fisherman, a durable spoon, which can be fished for long periods without replacement, and which is a compromise imitation of the natural food fish of the commercial fish sought.

With the tremendous influx of sports fishermen into the sport of salmon fishing, incurred no doubt by the large prizes given as part of the various fishing derbies, very keen competition has arisen among this type of fishermen. The prizes themselves are very valuable, but the personal satisfaction obtained by the individual winning one of these derbies, inclines them, as a whole, to demand an improvement in fishing lures. Now it is well known that salmon, in particular those salmon that are approaching the spawning areas, do not have the natural speed and agility common to the growing salmon, and it is their apparent desire in feeding to find those fish that may be crippled or otherwise easier to catch among the mass of candle fish, pilcher, or herring schools, on which the salmon prey. This conclusion has prompted the attempt on the part of many persons to produce spoons which will give a darting action or the effect of a crippled fish, and this present invention is designed to supply this general demand.

The principal object of this present invention, therefore, is to provide a one-piece metal spoon that is durable, and has high structural strength, that is capable of resisting distortion in use, and which gives a lifelike imitation of bait fish.

A further object of this present invention is to provide a one-piece metal spoon of the swimming type in which a controllable rocking action is provided, wherein the spoon rocks upon its longitudinal axis and thereby greatly increases the spread of the light transmitted by reflection from the spoon.

A further object of this invention is to provide a swimming type, one-piece spoon in which a prolonged swimming course is followed and terminated periodically by a quick darting action off to one side of the line of draft.

Further objects, advantages and capabilities will be apparent from the description and disclosure in the drawings, or may be comprehended or are inherent in the device.

In the drawings:

Figure 1 is a perspective view showing a trolling spoon made after the teachings of this present invention, the same being complete with hook;

Figure 2 is a top view of the lure of Figure 1, less the towing line and fishing hook, and occupying the position it normally assumes when pulled through the water;

Figure 3 is a face view looking into the concave side of the spoon;

Figure 4 is a front elevation of the spoon;

Figures 5, 6, 7, 8, and 9 are cross-sectional views taken along similarly numbered lines of Figure 3, in each case the vertical plane being indicated by a dashed line;

Figure 10 is a bracketed view, diagrammatic in form, showing successive positions of this spoon when drawn through the water in the act of fishing;

Figure 11 is a diagrammatic view showing the section of the spoon, similar to Figure 8, and showing the oscillation of the spoon about its longitudinal axis during the beginning of each cycle of its swimming operation.

Figure 12 is a view similar to Figure 11, but showing, in the diagrammatic view, the extreme of oscillation occurring during the operation of the spoon and just prior to the darting action;

Figure 13 is a plan view showing the spoon swimming in a vertical plane;

Figure 14 is a plan view showing the spoon taking off to the side in its darting action;

Figure 15 is a plan view showing the spoon at the completion of the darting action and being led back onto the line of draft, shown by the dashed lines. The line of draft, shown by the dashed lines, is a prolongation of the tow line of Figure 13.

Throughout the following description and in the claims, reference is made to the top and bottom edges of the body and the forward and rear ends of the same in spite of the fact that the lure assumes various positions in use. When the terms "top," and "bottom," "forward," "rear," etc., are used they have reference to the disposition of the spoon shown in Figures 2 to 9, in which edge 22 is the top edge, edge 26 is the bottom edge, edge 42 is the forward edge and edges 24 and 28 form the rear end.

Referring more particularly to the disclosure in the drawings, the numeral 20 designates generally the body of this fishing lure or spoon. It is of elongated form, having a top edge 22 that is substantially straight, as viewed in Figure 3 except where it turns down at 24 at the tail end of the spoon in a downward bend. The bottom of the spoon has a straight edge, as viewed in Figure 3, for part of the central portion, as shown at 26 with a downward bend at its forward end and an upward bend at its rear end. The upward bend is formed by a gradual curve 28, which swings up to meet curve 24, and the meeting point is well above the center or median of the spoon. The upward bend 28 at the rear end of the bottom edge starts before downward bend 24 at the rear end of the top edge and is more extensive although not making as abrupt a curve and together forming a tapered and pointed rear end. As viewed in Figure 3, the top and bottom edges of the bodies 22 and 26 respectively, throughout most of their extents lie substantially in horizontal planes which are parallel. A hole is pierced in the metal at 30 to which is secured, normally, a connecting ring 32, which may be the means of securing to the lure any desired type of fish hook 34. Experience has proved, however, that the single hook, substantially as shown in Figure 1, provides the best swimming action for a spoon of this order and makes it possible to have, in a minimum weight, a hook structure that is strong enough to successfully hold the type of fish normally caught on a lure of this order. Except for a portion at the head end of the spoon, the body of the spoon is concave as viewed in Figure 3, as will be noted from the various views 6, through 9 inclusive, and it is also curved on its longitudinal axis, as is best shown in Figure 2. Figure 2 also shows the lower water impinging surface 36, which plays a very important part in the functioning of this spoon. Spaced along forward edge 42 is a plurality of leading or towing holes 39, 40 and 41. Passing forward from the lines of holes 39 and 41, the upper margin of the straight leading portion 42 is bent to the left, as viewed in Figure 4, to form a rudder portion 44. This has the general effect of providing a curve at 46, which is just the reverse of the curves of Figures 6 through 9 inclusive. In other words, the body has a curvedly concave shape towards one side in vertical transverse cross-section, as shown in Figures 6 to 9, except for the extreme forward end where there is a reverse curve in the opposite direction; the body has a gradually curved, concave shape toward the aforementioned concave side in horizontal longitudinal cross-section except for the extreme forward end; and the forward edge 42 of the body lies substantially in a single transverse plane with the top portion of the forward edge disposed forward of the bottom portion of the same.

It has been found desirable to have two or more holes 39, 40 and 41 for the attachment of the towing ring 48 to which, normally, a swivel is attached and, in turn, to the swivel is attached the towing line 50. The effect of these different holes is to provide a convenient means whereby the fisherman can liken the action of his spoon to the speed of the boat from which he is trolling, or he may change the action of the lure at a given speed. It has been found that the closer the hole, to which the towing line is attached, comes to the longitudinal axis upon which the spoon oscillates, the faster will be the oscillations; consequently in a slow moving boat, the towing should be attached on, or close to, the line of longitudinal axis of oscillation, and if the spoon is to be trolled at relatively high speed, then the line of attachment should be off the longitudinal axis of oscillation or revolution. This axis of revolution is normally a line passing through hole 30 and extended forwardly so as to substantially bisect the spoon as illustrated in face view of Figure 3.

As this lure is first put into the water, and put under draft by the fishing line, the first action is that recorded in Figure 10, in which an undulating path is followed by the spoon as viewed in plan. The path of the head end of the lure is shown by a dotted line 52, in Figure 10 where it will be observed that it swings substantially equal amounts each side of the line of draft 54. It is to be noted that the tail end of the lure carrying hook 34 has a swing of much greater amplitude than the head end and is shown by the dashed line 56.

There appears to be a secondary action which is a pronounced fluttering, or, rather, oscillation of the extreme rear end of the spoon through a rather limited amplitude. Taking a medium sized spoon as an example, after the lure has been trolled 4 to 6 feet, the rocking on its longitudinal axis appears to increase in angular displacement until a point is reached where the spoons will make a complete revolution. It has not been observed to make more than one revolution, however, and this revolution is normally followed by a very sharp and abrupt veering or darting action, always in the same direction, in a prolongation of the curve of the spoon, after the showing of Figures 13, 14 and 15. The extent of this darting action seems to be merely a function of the speed at which the lure is being towed. At a speed estimated at three miles an hour, this darting sideways appears to be in the neighborhood of 6 to 8 inches; then, when the speed of the boat is increased to an estimated 5 to 6 miles per hour, the spoon will dart off to one side fully 12 to 15 inches. At the end of the darting action, it comes back to its line of draft, apparently in about three times the travel distance that it made the dart, consequently it might be said that the return is much more gradual, in the ratio approximately of 3 to 1, than the veering or dart. When the towing line, which takes a bend due to the resistance of the water as it is being moved sideways, pulls the spoon back onto the line of draft, the spoon is apparently without motion momentarily, and then takes up a new sequence of swimming movements which will go for 5 to 6 or 7 feet at the reduced speed and for from 8 to 12 feet at the higher speeds noted.

Observers generally agree that a salmon or other game fish will follow or pace a lure for some distance and then either leave it, if they are apparently suspicious of it or they will strike if it appears natural. This present lure, because of its ability to swim, dart, dive and roll, intermittently appears to satisfy a large proportion of the game fish and therefore has been proven to be a very effective spoon.

Now by way of explanation, reference is first made to the plan view of Figure 2, and to the various sectional views in Figures 6, 7, 8, and 9. The extending lip 36 on the bottom of the spoon, as viewed in Figures 2, 3 and 9, appears to be a relatively long water impingement surface that acts as a lever to locate the spoon about the line joining the line attaching ring and hook attaching ring. As viewed in Figure 9, the action of this impingement surface is to rotate the lure clockwise. Now, reference being made to Figure 4 and the associated cross-sectional view of Figure 5, it is to be noted that the leading edge of the spoon veers off to the left, as viewed in Figure 4, and this, acting as a forward rudder on the spoon, tends to rotate the spoon on its longitudinal axis, counter-clockwise; thus, it would appear that the rear end of the spoon and the front end of the spoon both tend to revolve the spoon, but, in opposite directions.

The oppositely directed rotative efforts produced by the leading edge of the spoon and the rear section, as illustrated in Figure 9, no doubt accounts for the rocking of the spoon about its longitudinal axis, as has been illustrated in Figures 11 and 12.

Reference is again made to Figure 2, this time to the curved form of the spoon, with respect to its longitudinal axis. This spoon, of course, is transversely curved, after the showing of Figures 6, 7, 8 and 9, but the longitudinal curve is very pronounced in this spoon, and, at the same time, when viewing Figure 2, the leading or forward rudder portion of the spoon is also well illustrated. The forward rudder portion will have the tendency to lead the towing ring of the spoon off to the left, as viewed in Figure 10, whereas the longitudinal curve as it passes through the water will tend to continue in that curve after the principles well demonstrated in the behavior of air foils in an ambient fluid. Now it is believed to be reasonably evident that these two forces are in conflict during the stages of progression of the spoon shown in Figure 10, and they tend to counter any wide swings that either element might induce in the spoon. The rear portion of the spoon, of course, as viewed in Figure 4, shows very clearly that the rear water impingement surface is, by all odds, the larger. However, the leading rudder effect is no doubt achieved by the very favorable positioning of this contra-ruddering leading edge. Then, too, we have ever present the drag of the towing line, and the fact that any side displacement of this line in the water meets with considerable resistance just due to the resistance of passing the line through the water sideways. This resistance of the line in resisting any displacement of itself in the water, no doubt, is a stabilizing influence that tends to keep the front edge of the spoon on a substantially straight draft line. The rear end of the spoon, having nothing but the weight of the fishhooks to hamper its movements, takes up the undulating path, as shown in Figure 10. While following this path, however, the movement of the tail through a very small amplitude, coupled with the rocking of the spoon on its longitudinal axis, gives a very much alive appearance to the spoon. This spoon has all the lifelike swimming action of the McMahon type of spoons, but it has, in addition to that, a movement of the spoon while following the undulating path, as viewed in plan, which can be best described as quivering, in that the amplitude of movement is very light, but that action, coupled with the rocking of the spoon, gives light reflected rays over a very large area, and apparently is one of the secrets of its unusual effectiveness on game fish.

The rocking action of this spoon, as it first starts its movement through the water, as it will appear at rest or the renewal of the cycle, has but a slight rocking motion, and this has been illustrated in Figure 11. Then, as the distance increases up to those previously specified, which is a function of the speed of the lure, this rocking increases in amplitude, so that we have the position of Figure 12, in which the spoon, in effect, has almost completed a revolution. Then finally the spoon does make a complete revolution at the climax of its gradual increasing rocking, and it is at this point that the darting action of the spoon occurs. It appears that, when the spoon has made one complete revolution, the rocking action has been completely destroyed momentarily, and the spoon at that instant is fully under control of the longitudinal curve of the spoon and the effect of the forward rudder action.

When the spoon has gone through its cycle of rocking and has made its complete revolution, then it appears that the contra-effect of the forward rudder combined with the drag of the tow line on one hand, and the large rear impingement surface on the other hand, stabilizes the spoon so that it is riding on edge without rocking. At this point the large curve of the spoon causes it to veer from the vertical plane position of Figure 13 to the outwardly directed position shown in Figure 14. This outward movement away from the line of draft continues until the combined action of the drag of the tow line, combined with the resistance of the tow line against being moved sideways through the water, coupled with the rudder action of the forward edge 44 of the spoon, causes the spoon to pivot on what would be the center, as viewed in Figure 15, and the lure then starts back to the line of draft. Now the outward swing of the spoon is of very abrupt action; the angle of departure of curve appears to be substantially 45 degrees from the line of draft. That would be a line tangent to that curved path during the dart, and the angle of recovery, which would be the angle that a tangent to the recovery path makes with the tow line, is approximately one-third of that, or 15 degrees, so that the return of the spoon to the line of the tow line is relatively gradual. During this return, the rocking of the spoon is again in evidence, and when the spoon has reached the tow line it takes up the travel, as illustrated in Figure 10, and repeats the cycle, these cycles being repeated in accordance with the speed at which the lure is towed, and varying between five to twelve feet of linear travel.

Now this action is quite unique in a swimming spoon; in other words, it presents the spoon in a swimming position so as to attract fish from a wide area. From the side of the spoon, as is common with all swimming spoons, but also from above and below the spoon, due to the rocking of the spoon on its longitudinal axis, it carries on a swimming action for several feet, much as a small food fish would do, were it not for being pursued. Then, periodically, the abrupt darting to the side occurs, such as would be observed in a small fish trying to elude a preying fish. This action, which is easily observable in clear water when this spoon is being fished, is without doubt the fundamental reason for the wonderful effectiveness of this lure.

It is believed that it will be clearly apparent from the above description and the disclosure in the drawings that the invention comprehends a novel construction of a darting fish lure of the swimming type.

Having thus disclosed the invention, I claim:

1. A darting fish lure, comprising: a rigid body made of a strip of thin material; the top and bottom edges of said body throughout the most of their extents lying substantially in horizontal planes which are parallel, said top edge having a downward bend at its rear end, said bottom edge having a downward bend at its forward end and an upward bend at its rear end, said upward bend at the rear end of said bottom edge starting before said downward bend at the rear end of said top edge and being more extensive although not making as abrupt a curve and together forming a tapered and pointed rear end; said body having a curvedly concave shape towards one side in vertical transverse cross section except for the extreme forward end where there is a reverse curve in the opposite direction, said body having a gradually curved, concave shape toward the aforementioned concave side in horizontal longitudinal cross-section except for the extreme forward end, the forward edge of said body lying substantially in a single transverse plane with the top portion of said forward edge disposed forward of the bottom portion of the same; and said lure having a hook secured near the rear end and means for securing a towing line near the front end.

2. A darting fish lure, comprising: a rigid body made of a strip of thin material; the top and bottom edges of said body throughout the most of their extents lying substantially in horizontal planes which are parallel, said top edge having a downward bend at its rear end, said bottom edge having a downward bend at its forward end and an upward bend at its rear end, said upward bend at the rear end of the bottom edge forming, together with said downward bend at the rear end of said top edge, a tapered rear end; said body having a curvedly concave shape towards one side in vertical transverse cross-section except for the extreme forward end where there is a reverse curve in the opposite direction, said body having a gradually curved, concave shape toward the aforementioned concave side in horizontal longitudinal cross-section except for the extreme forward end, the forward edge of said body lying substantially in a single transverse plane with the top portion of said forward edge disposed forward of the bottom portion of the same; and said lure having a hook secured near the rear end and a plurality of openings spaced apart along said forward edge for securing a towing line.

3. A darting fish lure, comprising: a rigid body made of a strip of thin material; the top and bottom edges of said body throughout the most of their extents lying substantially in horizontal planes which are parallel, said top edge having a downward bend at its rear end, said bottom edge having a downward bend at its forward end and an upward bend at its rear end, said upward bend at the rear end of said bottom edge starting before said downward bend at the rear end of said top edge and being more extensive although not making as abrupt a curve and together forming a tapered and pointed rear end; said body having a curvedly concave shape towards one side in vertical transverse cross-section except for the extreme forward end where there is a reverse curve in the opposite direction, said body having a gradually curved, concave shape towards the aforementioned concave side in horizontal longitudinal cross-section except for the extreme forward end; and said lure having a hook secured near the rear end and means for securing a towing line near the front end.

4. A darting fish lure, comprising: a rigid body made of a strip of thin material; the top and bottom edges of said body throughout the most of their extents lying substantially in horizontal planes which are parallel, said top edge having a downward bend at its rear end, said bottom edge having a downward bend at its forward end and an upward bend at its rear end, said upward bend at the rear end of said bottom edge forming, together with said downward bend at the rear end of said top edge, a tapered and pointed rear end, said body having a gradually curved, concave shape towards one side in horizontal longitudinal cross-section except for the extreme forward end, the forward edge of said body lying substantially in a single transverse plane with the top portion of said forward edge disposed forward of the bottom portion of the same; and said lure having a hook secured near the rear end and means for securing a towing line near the front end.

5. A darting fish lure, comprising: a narrow, elongated, rigid body made of a thin material; the top and bottom edges of said body being substantially evenly spaced apart throughout most of their extent; said body having a blunt forward edge; said body having a curvedly concave shape towards one side in vertical transverse cross-section except for the extreme forward end where there is a reverse curve in the opposite direction, said body having a gradually curved, concave shape towards the aforementioned concave side in horizontal longitudinal cross-section except for the extreme forward end, and said lure having a hook secured near the rear end and means for securing a towing line near the front end.

WILLIAM F. NIEMI.

REFERENCES CITED

The following references are of record in the file of this patent:

UNITED STATES PATENTS

| Number | Name | Date |
|---|---|---|
| 1,252,721 | Rice | Jan. 8, 1918 |
| 1,326,821 | Ackerman | Dec. 30, 1919 |
| 1,770,003 | Miller | July 8, 1930 |
| 1,861,905 | Bergstedt | June 7, 1932 |
| 2,058,121 | Allen | Oct. 20, 1936 |
| 2,239,802 | Westby | Apr. 29, 1941 |
| 2,264,211 | La Chance | Nov. 25, 1941 |
| 2,294,081 | Fairfax | Aug. 25, 1942 |
| 2,496,213 | Huntley | Jan. 31, 1950 |